July 17, 1923.
W. W. TUTTLE
TRACTOR WHEEL
Filed June 23, 1920
1,461,951
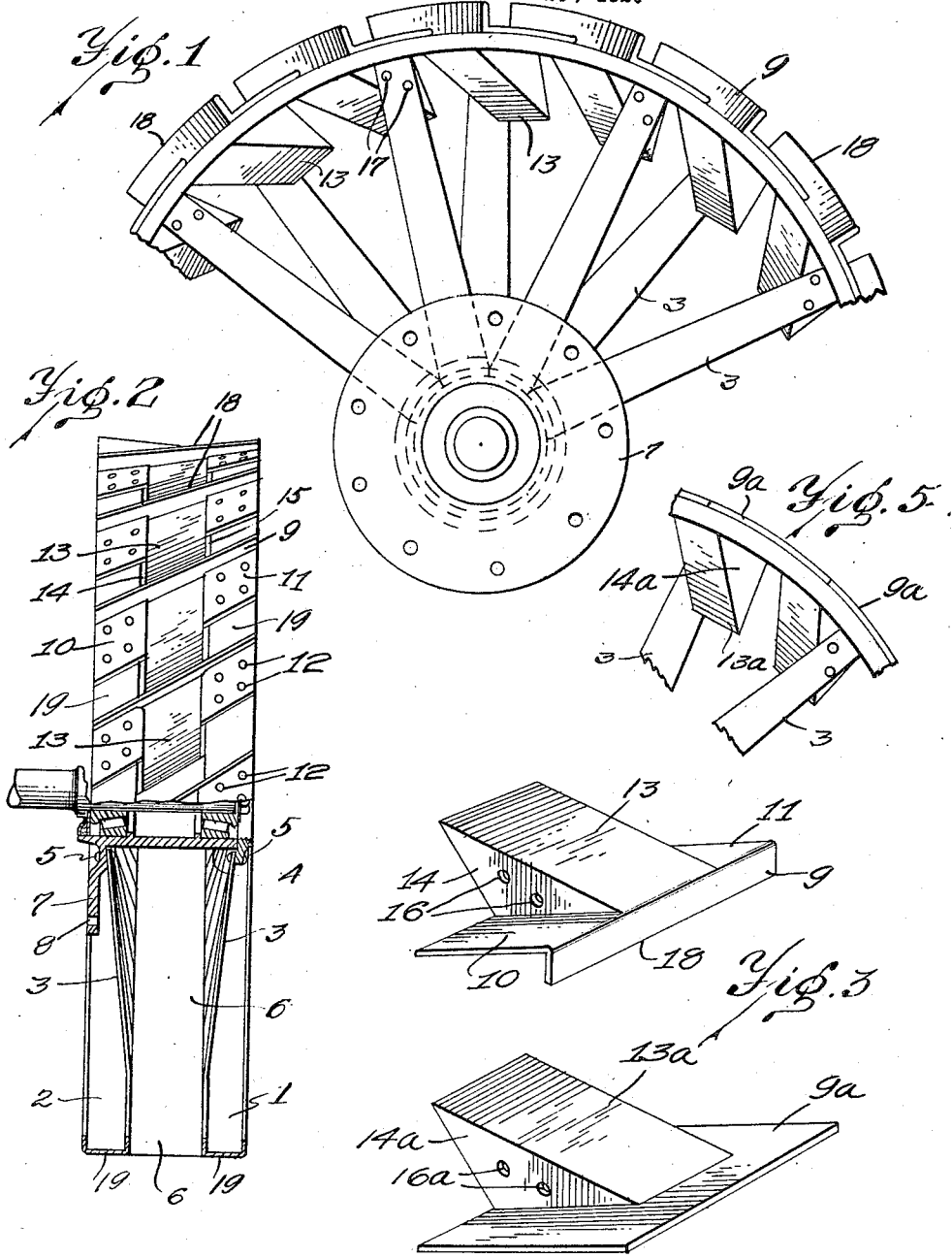
WITNESS:
Gilbert H. Hauk
INVENTOR
WALLACE W. TUTTLE
BY
Charles E. Weems
ATTORNEY Patented July 17, 1923.

1,461,951

UNITED STATES PATENT OFFICE.

WALLACE W. TUTTLE, OF DETROIT, MICHIGAN.

TRACTOR WHEEL.

Application filed June 23, 1920. Serial No. 391,000.

*To all whom it may concern:*

Be it known that I, WALLACE W. TUTTLE, a citizen of the United States, residing at Detroit, county of Wayne, State of Michigan, have invented a certain new and useful Improvement in Tractor Wheels, and declare the following to be a full, clear, and exact description of the same, such as will enable others skilled in the art to which it pertains to make and use the same, reference being had to the accompanying drawings, which form a part of this specification.

This invention relates to tractor wheels and the object of the invention is to provide a tractor wheel having cleats, the said cleats being so formed as to engage a greater amount of earth as the wheel sinks further thereinto thereby providing a wheel having excellent traction in soft ground as well as in hard ground. A further object of the invention is to provide a tractor wheel of the character described formed of two rim members spaced apart and provided with cleat members secured thereto having inwardly extending pockets adapted to engage the earth, the said pockets being so formed as to engage an increasingly greater amount of earth as the wheel sinks further thereinto. A still further object of the invention is to provide a tractor wheel of the character described the outer surface only of which engages the earth during travel over hard ground and as the wheel sinks into the earth during travel on softer ground an increasingly greater area of the wheel surface is supported thereon. In driving a tractor over a soft wet loam or swampy land the ordinary tractor wheel tends to sink into the soil until the tractor becomes mired but with this invention as the tractor wheel sinks further into the soil an increasingly greater area of the wheel surface is supported on the soil so that a tractor utilizing this type of wheel will not easily become mired. These objects and the several novel features of the invention are hereinafter more fully described and claimed and the preferred form of construction by which these objects are attained is shown in the accompanying drawings, in which—

Fig. 1 is a side elevation of a portion of a tractor wheel embodying my invention.

Fig. 2 is a plan view of the wheel, one half thereof being shown in section.

Fig. 3 is a perspective view of one of the cleat members adapted to be secured to the wheel rim and showing the position assumed by the cleat member during contact with the ground.

Fig. 4 is a view of a member similar to the cleat member shown in Fig. 3, but not provided with the cleat.

Fig. 5 is a view of a portion of the wheel rim utilizing the members shown in Fig. 4.

As is shown in Fig. 2, the wheel is provided with a pair of annular rim members 1 and 2, the spokes 3 of the said members being formed integrally therewith if desired and extending toward the hub 4 to which the spokes are secured by the rivets 5. By this construction an annular opening 6 is provided between the two rim members 1 and 2. The wheel hub 4 is preferably provided with a flange 7 having apertures 8 in which a brake band may be secured or, if the wheel is to be driven by a chain, in which a sprocket may be secured. As will be noted from Fig. 1 the spokes 3 on the opposite sides of the wheel are positioned alternately, that is the spokes on one side are aligned with the spaces between the spokes on the other side. Fitting between the rim members 1 and 2 I provide a plurality of cleat members 9 which extend outwardly from the periphery of the wheel and at an angle to the axis of rotation thereof as indicated more particularly in Fig. 2. These cleat members 9 are provided with a pair of plates or shoulders 10 and 11 bent at approximately a right angle to the cleat 9 and provided with a number of apertures 12 by which the said members 10 and 11 may be riveted to the rim members 1 and 2 which the members 10 and 11 fit. If desired the apertures in the members 10 and 11 may be done away with under which condition the shoulders 11 and 12 may be spot welded on the outer surface of the members 1 and 2. The member 9 is provided with an angularly extending portion or pocket 13 having side members 14 and 15 extending between the member 13 and the members 10 and 11 thereby providing a support for the member 13. This depending portion or pocket 13 extends inwardly towards the center of the wheel in the space 6 between the rim members 1 and 2 indicated more particularly in Fig. 1 in which the angular form of the said members is indicated. By securing these members 9 to the rim members 1 and 2 the said rim members are secured together thereby providing a strong and substantial wheel which cannot come apart. To further strengthen the wheel I provide apertures 16 in alternate sides 14 and 15 of the cleat member 9 through which rivets 17 may be passed and secured to the adjacent spoke. In Figs. 4 and 5 an alternative form of the device is shown in which the extending cleats 9 are extended to a flat plane as indicated at 9ª in Fig. 4. Projecting inwardly from the plate 9ª is an angular pocket 13ª similar to the pocket 13 shown in Fig. 3. The plates 9ª are then secured to the outer periphery of the wheel and the pockets 13ª are positioned in the annular space 6 between the rims 1 and 2. The plates 9ª are secured to the rims 1 and 2 with the edges of each adjacent plate abutting as indicated in Fig. 5, so that the wheel is provided with a smooth outer face which will not injure any type of road surface and which when used on soft ground will engage an increasingly greater amount of earth as the wheel sinks thereinto.

In operation the wheel is secured to the axle of a tractor in the usual manner and when the tractor is being driven on a road or on hard ground the only part of the wheel engaging the ground is the outer edges 18 of the members 9. When the machine is driven on soft ground the members 9 sink into the ground until the earth engages the shoulders 10 and 11 of the members 9 and the exposed faces 19 of the members 1 and 2 as indicated in Fig. 2. In extremely soft ground or in driving over swampy land the wheel may sink in still further so that not only the shoulders 10 and 11 engage the earth but the faces 13 of the cleat members 9 also engage the earth and on account of the angular position of the members 13 an increasingly greater amount of earth is engaged thereby as the wheel sinks more deeply into the earth thus providing additional wheel surface engaging the earth whereby the traction of the wheel is materially increased. It will be noted that the pockets 13 are open at the end so that the said pockets will not become clogged with earth, the earth being discharged through the openings toward the interior of the wheel.

By this construction a wheel is provided which will not easily become mired and which when used in soft loam or swampy ground is provided with additional traction surface which increases proportionately as the wheel sinks further into the earth.

From the foregoing description it becomes evident that the device, while of a somewhat simple nature is very efficient in operation, of very cheap manufacturing cost, may be easily cleaned and provides a device which accomplishes the objects desired.

Having thus fully described my invention, its utility and mode of operation, what I claim and desire to secure by Letters Patent of the United States is—

1. In a tractor wheel, a pair of rim members, a hub, spokes extended therebetween, a plurality of cleat members secured to the rims and spacing the same, said cleat members each having a pocket open to the wheel periphery and extending inwardly of the rims at an angle to a tangent of the wheel.

2. In a tractor wheel, a hub, spokes emanating therefrom, a pair of rim members supported by the spokes, a plurality of cleat members secured to the face of the rim members and spacing the same, each cleat member being provided with a pocket open to the wheel periphery and extending inwardly therefrom with the wall of the pocket opposite the opening lying at an angle to a tangent of the wheel, the pocket being positioned between the said rim members.

3. In a tractor wheel, a hub member, a series of spokes emanating from each end thereof, a pair of rim members, each secured to one of the series of spokes, a plurality of cleat members secured to the rim members and spacing the same, the cleat members being positioned at an angle to the axis of rotation of the wheel and each being provided with a pocket open to the periphery of the wheel and extending inwardly toward the hub in the space between the rim members, the said socket of each cleat member being attached to an adjacent spoke.

4. In a tractor wheel, a pair of rim members having spokes extending inwardly therefrom, a plurality of cleat members secured to the periphery of the rim members and spacing the same, each of said cleat members having a portion providing a pocket open to the periphery of the wheel and extending inwardly thereof between the said spokes.

5. In a tractor wheel, a pair of rim members having spokes extending inwardly therefrom, a hub for the spokes, a plurality of cleat members secured to the periphery of the rim members spacing the same, each cleat member having a portion extending inwardly between the rims and providing a pocket open to the periphery of the wheel, the pockets lying at an angle to the center plane of the wheel and the inner wall of each pocket lying at an angle to a tangent of the wheel.

In testimony whereof, I sign this specification.

WALLACE W. TUTTLE.